United States Patent [19]
Kodama et al.

[11] Patent Number: 5,493,870
[45] Date of Patent: Feb. 27, 1996

[54] AIR CONDITIONING APPARATUS FOR VEHICLE

[75] Inventors: Satoru Kodama, Obu; Yuji Takeo, Toyoaka; Eiji Takahashi, Toyohashi; Akira Isaji, Nishio, all of Japan

[73] Assignee: Nippondenso Co., Ltd., Kariya, Japan

[21] Appl. No.: 427,040

[22] Filed: Apr. 24, 1995

[30] Foreign Application Priority Data

Apr. 22, 1994 [JP] Japan .................................. 6-084519

[51] Int. Cl.$^6$ .................................................. F25D 21/00
[52] U.S. Cl. .................................................. 62/155; 62/80
[58] Field of Search .............................. 62/158, 155, 80, 62/90, 156

[56] References Cited

U.S. PATENT DOCUMENTS 5,355,690  10/1994  Iritani et al. ............................ 62/90 X

FOREIGN PATENT DOCUMENTS 0223941  11/1985  Japan ......................................... 62/80
63-71414  3/1988  Japan .

*Primary Examiner*—William E. Wayner
*Attorney, Agent, or Firm*—Cushman, Darby & Cushman

[57] ABSTRACT

An air conditioning apparatus includes an air duct having an inlet and an outlet supplying conditioned air, and an air conditioner for cooling and heating air using a refrigeration cycle. In the refrigeration cycle, the air conditioner includes a first heat exchanger, a second heat exchanger disposed on a downstream side of the first heat exchanger, and a compressor. The air conditioner selectively operates in a cooling mode where cool air cooled by the first heat exchanger is supplied through the outlet of the air duct, in a heating mode where hot air heated by the first heat exchanger is supplied through the outlet of the air duct, and in a dehumidifying mode where air cooled by the first heat exchanger and subsequently heated by the second heat exchanger is supplied through the outlet of the air duct. In order to prevent frosting of the heat exchanger functioning as an evaporator, a temperature sensor just downstream of the first heat exchanger in conjunction with a timer and control arrangement increase the evaporator temperature if it is below a set lower limit for a set period of time.

15 Claims, 3 Drawing Sheets

AIR CONDITIONING APPARATUS FOR VEHICLE

CROSS REFERENCE TO RELATED APPLICATION

The present invention is based on and claims priority from Japanese application No. 6-84519 filed on Apr. 22, 1994, the content of which is incorporated herein by reference.

BACKGROUND OF THE INVENTION

1. Field of the Invention

The present invention relates to vehicle air conditioning apparatus which is capable of preventing the freezing of a heat exchanger and which functions as an evaporator in the air conditioner's cooling and dehumidifying modes.

2. Related Art

Conventionally, in an air conditioner for a vehicle, in order to prevent condensed water on the surface of a heat exchanger while functioning as an evaporator in the air conditioner's cooling and dehumidifying modes, from freezing and building up ice deposits, a lower operational temperature of the heat exchanger is set beforehand to prevent freezing. Any decrease in effectiveness of the heat exchanger and damage to the system's compressor due to liquid being fed to the compressor (i.e., a liquid back phenomenon) are prevented by controlling the temperature of the heat exchanger so that it is not lower than the lower operational temperature.

However, in a vehicle air conditioner implementing the above freeze prevention function, when the system is in a low temperature environment (such as in the winter) and is operating in a dehumidifying mode to avoid fogging effects, the freeze prevention function may terminate the heat exchanger operation more quickly than is desirable (even before the dehumidifying mode is started), thereby causing a problem.

In such a situation, it is advantageous to supply low-humidity outside air into the passenger compartment or to operate the system in a heating mode and then perform the dehumidifying operation. However, if the outside air is dirty (e.g., when the vehicle is travelling through a tunnel or when it is travelling on an unpaved road), such outside air preferably is not supplied to the passenger compartment. So, the first above-mentioned technique in which outside air is supplied during the dehumidifying operation does not produce satisfactory results. When the system is operated in a heating mode and the dehumidifying operation is then performed as in the second above-mentioned technique, it is impossible to perform a dehumidifying operation until the engine has warmed-up. Therefore, the dehumidifying operation cannot be performed during engine start-up in a cold environment.

As discussed above, when the temperature of an evaporator in a conventional air conditioning system is equal to or lower than a set temperature during a refrigeration cycle, operation of the system's compressor is stopped to prevent ice formation on the evaporator. In order to perform a defogging operation reliably, Japanese Patent Laid-Open Publication No. Sho 63-71414 discloses that while the defogging operation is performed, operation of the compressor is continued for a predetermined time period measured by a timer even when the temperature of the evaporator is equal to or lower than the set temperature, thereby performing a defogging operation in spite of the low outside air temperature.

However, the amount of condensed water collecting on the surface of the evaporator depends on the temperature of the intake air which exchanges heat with the evaporator. So, in the above system in which the operation of the compressor is continued for a predetermined time period independently of the evaporator temperature, when the temperature of the intake air is high, the amount of condensed water which collects on the surface of the evaporator during freezing conditions may become extraordinarily large. In such a situation, it is impossible to avoid deterioration of the evaporator's heat exchanging ability, and damage to the compressor may result from liquid back effects. Further, according to the above publication, the compressor is stopped after a predetermined time period measured by the timer has passed. However, when the temperature of the intake air is low (e.g., when the outside temperature is low), the condensed water which has frozen on the evaporator may remain if the compressor is simply stopped. Thus, when the compressor resumes operation, the likelihood that the heat exchanging ability of the evaporator will be adversely affected may be increased.

SUMMARY OF THE INVENTION

The present invention is made in view of the above problems, and an object of the present invention is to provide an air conditioning apparatus which prevents the possibility of condensed water freezing on a surface of a heat exchanger functioning as an evaporator and which reliably performs a dehumidifying operation using the heat exchanger when the outside air temperature is low.

According to the present invention, an air conditioning apparatus for a vehicle includes an air duct having an inlet for receiving air to be conditioned and an outlet supplying conditioned air into the passenger compartment of the vehicle and an air conditioner for cooling and heating air received through the inlet of the air duct to supply conditioned air through the air outlet by using a refrigeration cycle. The refrigeration cycle includes a first heat exchanger disposed in the air duct, a second heat exchanger disposed in the air duct at a downstream side of the first heat exchanger, and a compressor.

The air conditioner selectively operates in a cooling mode where cool air cooled by the first exchanger is supplied through the outlet of the air duct, in a heating mode where hot air heated by the first heat exchanger is supplied through the outlet of the air duct, and in a dehumidifying mode where air cooled by the first heat exchanger and subsequently heated by the second heat exchanger is supplied through the outlet of the air duct.

The apparatus also includes a temperature sensor for detecting a temperature corresponding to a temperature of the first heat exchanger, a timer unit for measuring an elapsed time period while the temperature of the first heat exchanger detected by the temperature sensor is equal to or less than a predetermined lower limit value, and a temperature control device for increasing the temperature of the first heat exchanger when the elapsed time period measured by the timer unit is greater than or equal to an operation permitting time.

Using this system, it is possible to prevent reliably a situation where water condenses and freezes on a surface of the heat exchanger functioning as an evaporator and to perform reliably a dehumidifying operation using the heat exchanger even when the outside air temperature is low.

It is preferable that the system includes an outside air temperature sensor for detecting the temperature of the outside air and that the operation permitting time is shortened in accordance with an increase in the outside air temperature which is detected by the outside air temperature sensor.

It is also preferable that the temperature control device increases the temperature of the first heat exchanger by decreasing a rotational speed of the compressor.

BRIEF DESCRIPTION OF THE DRAWINGS

Other objects, features and characteristics of the present invention as well as the functions of related parts will become more clear from a study of the following detailed description, the appended claims and the drawings. In the accompanying drawings:

DETAILED DESCRIPTION OF THE PREFERRED EMBODIMENTS

An embodiment of the present invention is described below with respect to the drawings.

Figure 1:
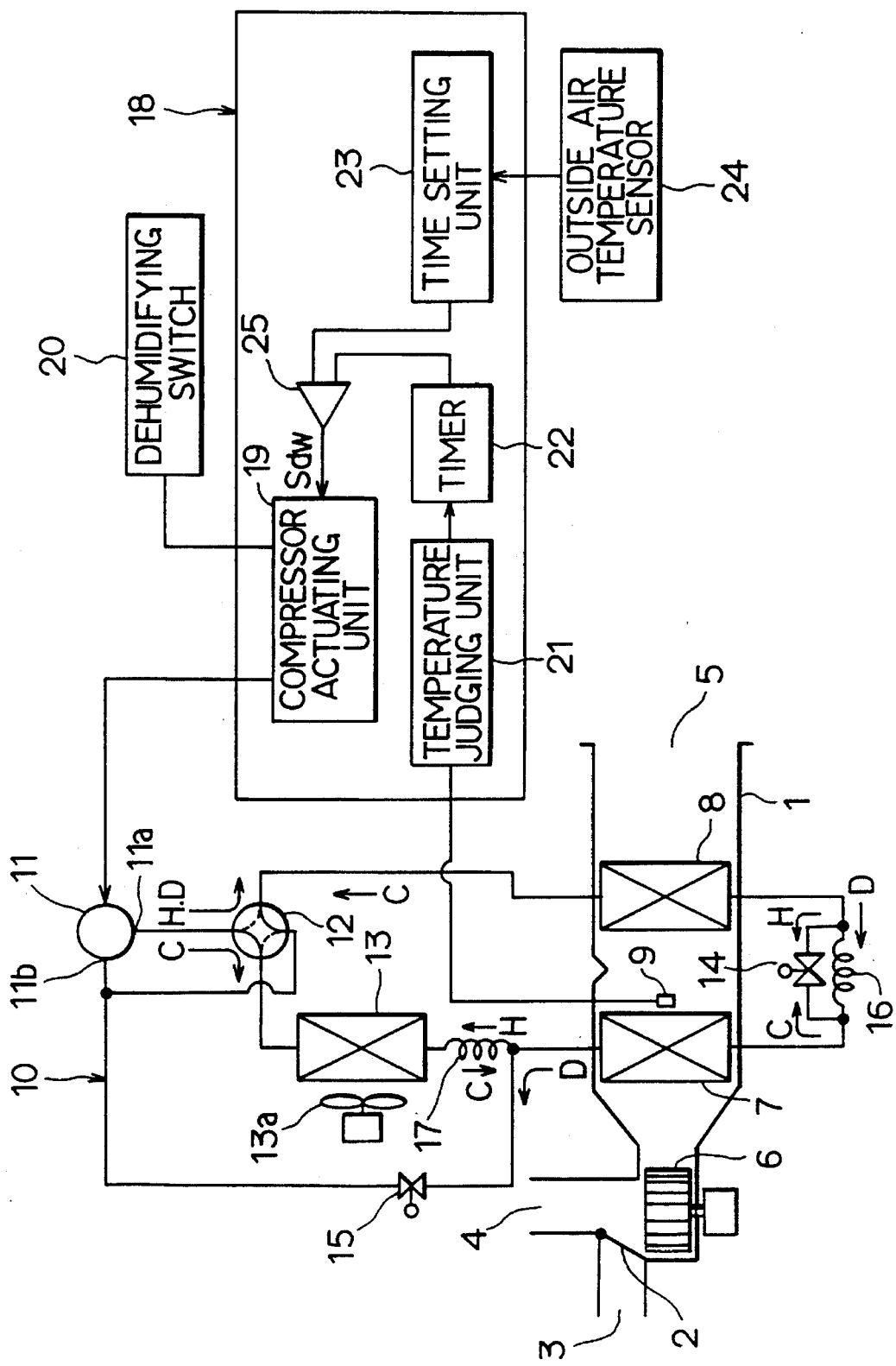
FIG. 1 shows a system according to a first embodiment of the present invention.

In FIG. 1, an embodiment of an air conditioning apparatus according to the present invention is schematically illustrated. In that Figure, an air duct 1 is equipped with an inside air inlet 3 and an outside air inlet 4 which are opened and closed by an inside/outside switching damper 2 at a downstream side of the inlets 3 and 4. Damper 2 is operated by the driver to bring in outside air or to close it off and circulate the inside air. An opening portion 5 formed at a downstream side of the air duct 1 is connected to a diverging duct (not shown) for supplying conditioned air into air supply outlets opening into a passenger compartment (e.g., a defroster air outlet, a face air outlet and a foot air outlet).

In air duct 1, a ventilating unit such as a blower 6 is disposed proximate to inside air inlet 3 and outside air inlet 4, and a first heat exchanger 7 and a second heat exchanger 8 are disposed at a downstream side of blower 6 in that order. Each of the heat exchangers 7 and 8 is equipped with a plurality of heat radiating fins (not shown) to improve their ability to exchange heat with ventilation air from blower 6.

In air duct 1, a temperature sensor 9 for detecting the temperature of air at a downstream side of first heat exchanger 7 is disposed between first heat exchanger 7 and second heat exchanger 8.

Heat exchanger 7 and heat exchanger 8 are components of a refrigeration cycle 10 which is capable of forming a heat pump cycle. In this refrigeration cycle 10, a four-way valve 12, the first heat exchanger 7, the second heat exchanger 8, and outdoor heat exchanger 13 equipped with a heat radiating fan 13a, a first bypass valve 14, a second bypass valve 15, a first capillary tube 16 and a second capillary tube 17 connect a refrigerant outlet 11a of a compressor 11 with a refrigerant inlet 11b thereof. Compressor 11 is operated by an actuator such as a sealed-type actuator having an alternating current motor therein. The amount of refrigerant discharged by the compressor 11 is controlled by changing the speed of the alternating current motor with an inverter device which is described below.

In refrigeration cycle 10, four-way valve 12 switches between a cooling mode (shown by the solid line), where refrigerant outlet 11a of compressor 11 is connected to the outdoor heat exchanger 13 and refrigerant inlet 11b of compressor 11 is connected to the second heat exchanger 8, and a heating/dehumidifying mode (shown by the chained line), where refrigerant outlet 11a of compressor 11 is connected to the second heat exchanger 8 and refrigerant inlet 11b of compressor 11 is connected to the outdoor heat exchanger 13.

One end of first heat exchanger 7 is connected to four-way valve 12 via a first pressure decreasing device in the form of a capillary tube 16 and second heat exchanger 8, and the other end is connected to four-way valve 12 via a second pressure decreasing device in the form of a capillary tube 17 and outdoor heat exchanger 13. First bypass valve 14 shunts first capillary tube 16, and second bypass valve 15 is connected between refrigerant inlet 11b of compressor 11 and a point between first heat exchanger 7 and second capillary tube 17.

In refrigeration cycle 10 as described above, the flow of refrigerant is controlled as follows by switching four-way valve 12, first bypass valve 14 and second bypass valve 15, thereby establishing a cooling mode, a heating mode and a dehumidifying mode of an air conditioning operation. In the cooling mode, four-way valve 12 is set in the cooling mode position (shown by the solid line), first bypass valve 14 is set in an open position and second bypass valve 15 is set in a closed position. Thus, as shown by the arrow C in FIG. 1, refrigerant from compressor 11 flows through four-way valve 12, outdoor heat exchanger 13, second capillary tube 17, first heat exchanger 7, first bypass valve 14, second heat exchanger 8, four-way valve 12 and compressor 11 in that order.

Therefore, outdoor heat exchanger 13 serves as an evaporator of refrigerant, and first heat exchanger 7 serves as a condenser of refrigerant. The temperature of first heat exchanger 7 is lowered, and ventilation air from blower 6 is cooled by first heat exchanger 7. In this case, second heat exchanger 8 essentially serves as a pipe through which vaporized refrigerant passes.

In the heating mode, four-way valve 12 is set in the heating/dehumidifying mode position (shown by the chained line), first bypass valve 14 is set in the open position and second bypass valve 15 is set in the closed position. Thus, as shown by the arrow H in FIG. 1, refrigerant from compressor 11 flows through four-way valve 12, second heat exchanger 8, first bypass valve 14, first heat exchanger 7, second capillary tube 17, outdoor heat exchanger 13, four-way valve 12 and compressor 11 in that order.

Therefore, first heat exchanger 7 and second heat exchanger 8 serve as condensers, and outdoor heat exchanger 13 serves as an evaporator. The temperatures of first heat exchanger 7 and second heat exchanger 8 are raised, and ventilation air from blower 6 is heated by first heat exchanger 7 and second heat exchanger 8.

In the dehumidifying mode, four-way valve 12 is set in the heating/dehumidifying mode position (chained line), first bypass valve 14 is set in a closed position and second bypass valve 15 is set in an open position. Thus, as shown by the arrow D in FIG. 1, refrigerant from compressor 11 flows through four-way valve 12, second heat exchanger 8, first capillary tube 16, first heat exchanger 7, second bypass valve 15 and compressor 11 in that order. In such a case, the heat radiating fan 13a is stopped.

Therefore, second heat exchanger 8 serves as a condenser, and first heat exchanger 7 serves as an evaporator. The temperature of second heat exchanger 8 is increased, and the temperature of first heat exchanger 7 is lowered. Ventilation air from blower 6 is temporarily cooled by first heat exchanger 7 and then is heated by second heat exchanger 8. Thus, moisture in the ventilation air from blower 6 condenses on a surface of the first heat exchanger 7 and is removed in accordance with a decrease in the saturated evaporation temperature when the ventilation air from blower 6 exchanges heat with first heat exchanger 7. Subsequently, relative humidity is greatly lowered when the ventilation air is reheated through heat exchange with second heat exchanger 8.

The operation of compressor 11 is controlled by a control apparatus. 18. Control apparatus 18 may be included in an ECU (Electronic Control Unit) for controlling the air conditioning operation; however, only the main control portion related to the present invention is shown in FIG. 1.

In control apparatus 18, a compressor actuating unit 19 includes an inverter for changing the speed of the alternating current motor in the compressor 11. When a dehumidifying switch 20 is in an "ON" position, compressor actuating unit 19 drives compressor 11 at a predetermined rotational speed. When the dehumidifying switch 20 is in an "OFF" position, four-way valve 12 is switched to the heating/dehumidifying position, first bypass valve 14 is switched to a closed position, and second bypass valve 15 is switched to an open position.

A temperature judging unit 21 judges whether or not a detected temperature Td (which corresponds to a temperature at a downstream side of first heat exchanger 7) which is detected by temperature sensor 9 is less than or equal to a lower limit temperature Tf. If Td23 Tf, an operation instruction signal is outputted, since this condition indicates that condensed water on the surface of first heat exchanger 7 is collecting and freezing.

A timer 22 starts a timing operation in accordance with the above operation instruction signal. Timer 22 terminates the timing operation and is reset when the operation instruction signal is terminated. Therefore, a timer counting value Σt from timer 22 means the time which has elapsed during which the temperature Td detected by temperature sensor 9 is less than or equal to the lower limit temperature Tf.

A time setting unit 23 sets an operation permitting time $t_{max}$ which is the maximum permissible time during which Td may be less than or equal to the lower limit temperature Tf, i.e., the maximum permissible time during which condensed water is allowed to collect and freeze on the first heat exchanger 7. The operation permitting time $T_{max}$ is shortened in accordance with an increase in an outside air temperature detected by outside air temperature sensor 24 as shown in FIG. 2.

Figure 2:
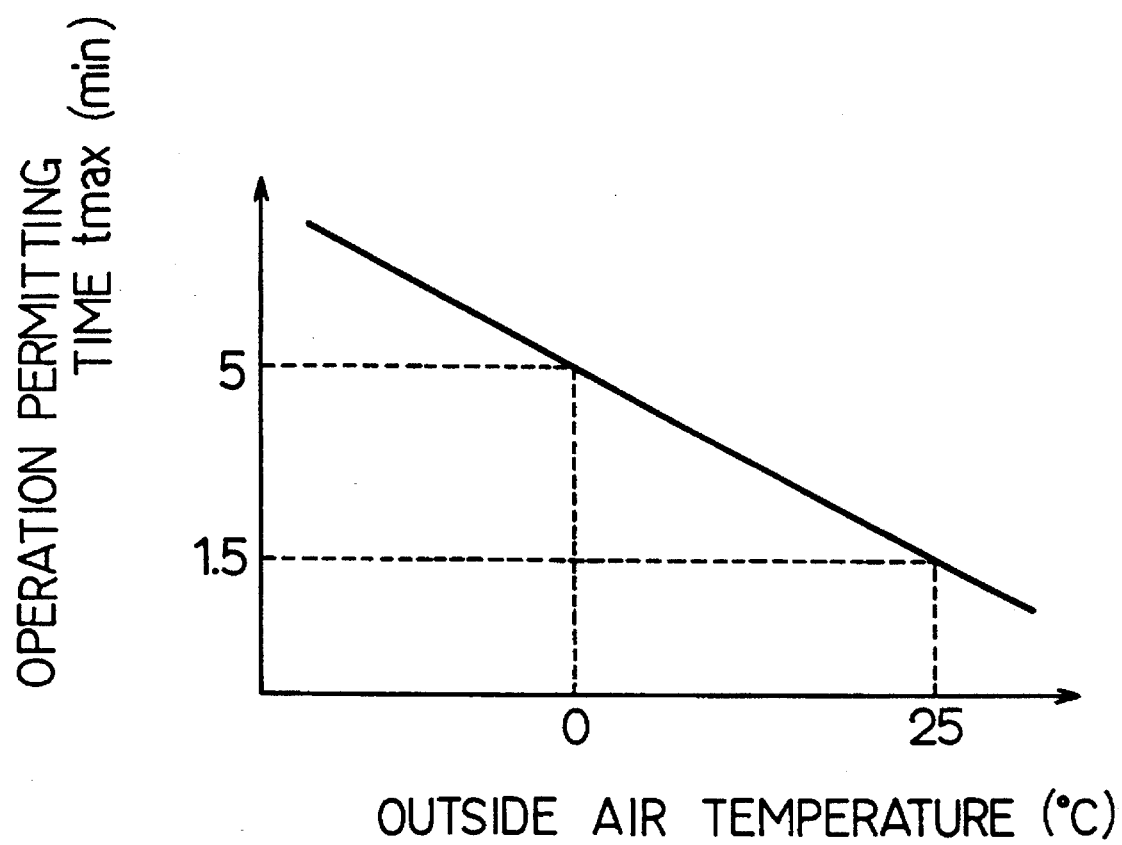
FIG. 2 is a graph illustrating an operational principle of the present invention.

The relationship between the outside air and the operation permitting time $T_{max}$ is shown by the negatively sloped line shown in FIG. 2. The line has a negative slope because the amount of condensed water produced during the air conditioning operation increases in accordance with the outside air temperature. Of course, it is preferable that the maximum permissible amount of condensed water be as large as possible without adversely affecting the operation of first heat exchanger 7.

The graph line shown in FIG. 2 is based on an outside air humidity being constant. However, the graph line can be varied responsive to a signal from a humidity sensor (not shown) which detects outside air humidity. In that case, the higher the detected humidity, the shorter the operation permitting time $T_{max}$. Although this technique provides more precise control, there may be little need to control the operation permitting time $T_{max}$ based on the outside air humidity, since first heat exchanger 7 is most likely to be frozen in the winter when outside air humidity is relatively low.

A comparing unit 25 compares the timer counting value Σt from timer 22 and the operation permitting time $T_{max}$ and outputs a rotational speed decreasing signal Sdw to compressor actuating unit 19 when $\Sigma t \geq T_{max}$.

In that case, when compressor actuating unit 19 receives the rotational speed decreasing signal Sdw, the motor of compressor 11 slows down and the refrigerant discharging ability of the compressor 11 is decreased, thereby increasing the temperature of first heat exchanger 7.

Figure 3:
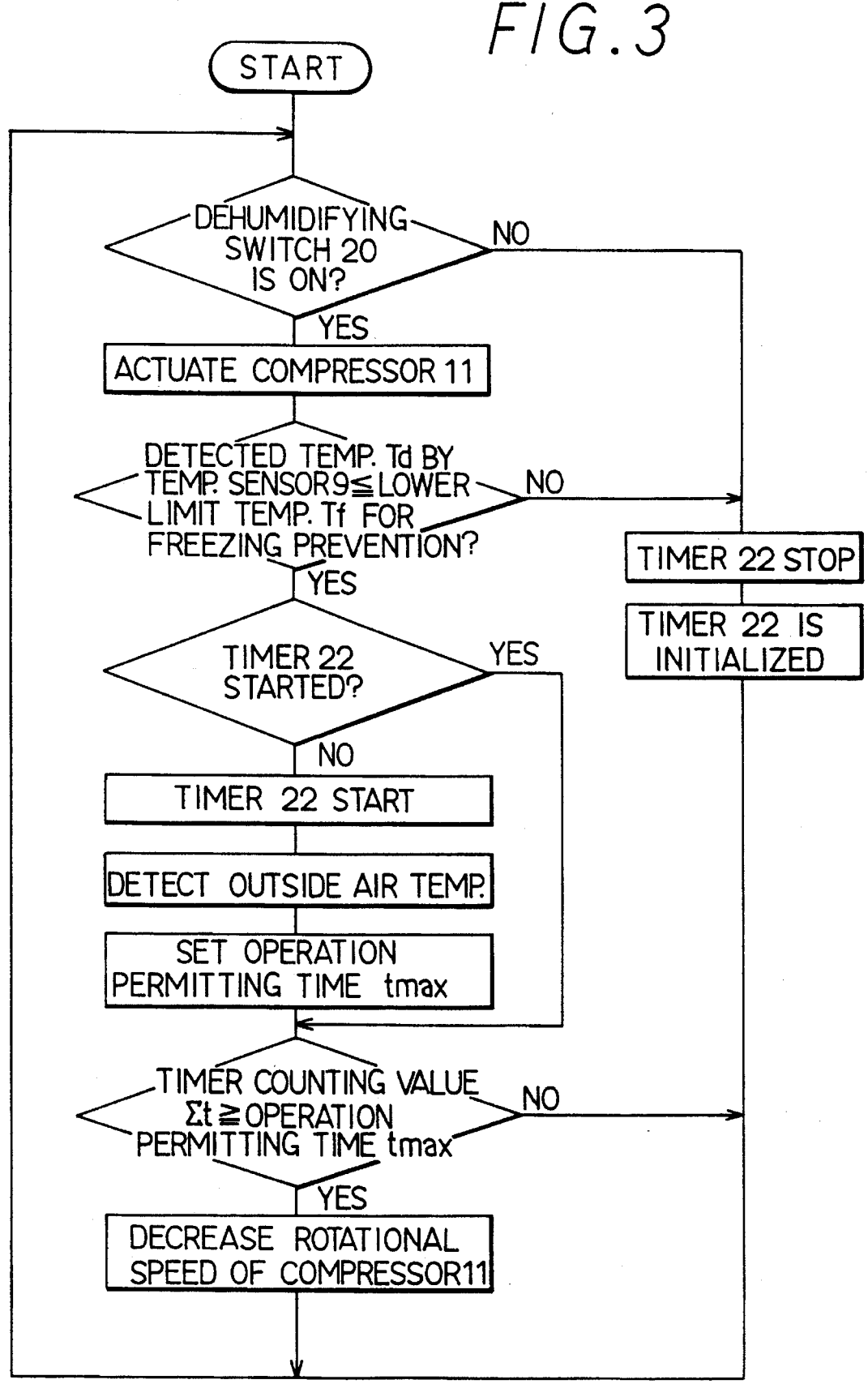
FIG. 3 is a flow chart showing a control process by a control apparatus.

The control operation performed by control apparatus 18 as described above is summarized in the flow chart of FIG. 3. When dehumidifying switch 20 is set in an "ON" position, compressor 11 is actuated. Then, four-way valve 12, first bypass valve 14 and second bypass valve 15 are switched to operate a dehumidifying mode in refrigeration cycle 10. In this way, first heat exchanger 7 and second heat exchanger 8 serve as an evaporator and a condenser, respectively, to perform a dehumidifying operation.

In such a dehumidifying operation, when the air temperature at the downstream side of first heat exchanger 7, i.e., the temperature Td detected by temperature sensor 9, is equal to or less than the lower limit temperature Tf, timer 22 starts a timing operation and an operation permitting time $T_{max}$ is calculated in accordance with the outside air temperature at that time in time setting unit 23. When a timer counting value Σt (the elapsed time during which the temperature Td detected by temperature sensor 9 is less than or equal to the lower limit temperature Tf) is greater than or equal to the operation permitting time $T_{max}$, the rotational speed of the motor of compressor 11 is lowered and the temperature of first heat exchanger 7 is increased.

As a result of the above control operation, it is possible to prevent a situation where condensed water freezes on the surface of the first heat exchanger 7 and builds up there. So, even when the outside air temperature is low, a dehumidifying operation by first heat exchanger 7 can be reliably performed. When the outside air temperature is relatively high and the amount of condensed water frozen on the surface of first heat exchanger 7 in the dehumidifying mode tends to become large, the amount of water which has been produced is regulated to be less than a predetermined value because the operation permitting time $T_{max}$ is shortened. As a result, it is possible to prevent the amount of condensed water frozen on the surface of first heat exchanger 7 from becoming extraordinarily large. It is also possible to prevent energy loss due to intermittent operation of the compressor, because the temperature of first heat exchanger 7 is increased by decreasing the rotational speed of compressor 11.

The present invention is not limited to the above embodiment, and other modifications and expansions can be included within the scope of the invention. For example, rather than decreasing the rotational speed of compressor 11 to increase the temperature of the first heat exchanger 7, it is possible to increase the temperature by opening first bypass valve 14 and closing second bypass valve 15 while compressor 11 is being operated in a dehumidifying mode, thereby temporarily switching to a heating mode.

Also, it is possible to detect the temperature of the surface of first heat exchanger 7 instead of detecting the air temperature downstream from first heat exchanger 7. Further, there is a relationship between the temperature of heat exchanger 7 and the pressure of refrigerant in the first heat exchanger 7 at its side proximate to valve 15, so it is possible to provide a sensor for detecting such a pressure instead of temperature sensor 9.

Further, an expansion valve can be used to decrease the refrigerant pressure instead of first and second capillary tubes 16 and 17. Also, instead of calculating the operation permitting time $T_{max}$ in time setting unit 23 in accordance with the outside air temperature, it is possible to base the calculation on the air temperature at the upstream side of first heat exchanger 7. As shown in FIG. 2, the higher the upstream side air temperature, the shorter the operation permitting time $T_{max}$ should be.

Of course, the present invention is not limited to an air conditioning apparatus for an electric vehicle, but may also be used in an air conditioning apparatus for any vehicle operated by an engine.

The present invention has been described in connection with what are presently considered to be the most practical and preferred embodiments. However, the invention is not meant to be limited to the disclosed embodiments, but rather is intended to include all modifications and alternative arrangements included within the spirit and scope of the appended claims.

What is claimed is:

1. An air conditioning apparatus for a vehicle having a passenger compartment, said apparatus comprising:

an air duct having an inlet for receiving air to be conditioned and an outlet for supplying conditioned air to said passenger compartment;

an air conditioner for cooling and heating air received through said inlet of said air duct to supply conditioned air through said air outlet by using a refrigeration cycle, said refrigeration cycle including a first heat exchanger disposed in said air duct, a second heat exchanger disposed in said air duct at a downstream side of said first heat exchanger, and a compressor circulating refrigerant through said refrigeration cycle, said air conditioner being selectively operable in a cooling mode where cool air cooled by said first heat exchanger is supplied through said outlet of said air duct, a heating mode where hot air heated by said first heat exchanger is supplied through said outlet of said air duct, and a dehumidifying mode where air cooled by said first heat exchanger and subsequently heated by said second heat exchanger is supplied through said outlet of said air duct;

a temperature sensor for detecting a temperature corresponding to a temperature of said first heat exchanger;

a timer unit for measuring an elapsed time period during which said temperature detected by said temperature sensor is less than or equal to a predetermined lower limit value; and temperature control means for increasing said temperature of said first heat exchanger when said elapsed time period is greater than or equal to an operation permitting time.

2. An air conditioning apparatus according to claim 1, wherein said temperature sensor detects an air temperature at said downstream side of said first heat exchanger.

3. An air conditioning apparatus according to claim 1, further comprising an outside air temperature sensor for detecting a temperature corresponding to a temperature of outside air, wherein said temperature control means shortens said operation permitting time responsive to an increase in said outside air temperature.

4. An air conditioning apparatus according to claim 3, wherein said temperature control means increases said temperature of said first heat exchanger by decreasing an operational speed of said compressor.

5. An air conditioning apparatus according to claim 1, wherein said temperature control means increases said temperature of said first heat exchanger by decreasing an operational speed of said compressor.

6. An air conditioning apparatus according to claim 1, wherein said temperature control means increases said temperature of said first heat exchanger by causing said air conditioner to operate in said heating mode.

7. An air conditioning apparatus for a vehicle having a passenger compartment, said apparatus comprising:

an air duct having an inlet for receiving air to be conditioned and an outlet for supplying conditioned air to said passenger compartment;

an air conditioner for cooling and heating air received through said inlet of said air duct to supply conditioned air through said air outlet by using a refrigeration cycle circulating refrigerant therein, said refrigeration cycle including a first heat exchanger disposed in said air duct, a second heat exchanger disposed in said air duct at a downstream side of said first heat exchanger, an outside heat exchanger disposed outside of said air duct, a compressor for compressing said refrigerant, and at least one pressure decreasing device for decreasing pressure in said refrigeration cycle, said air conditioner being selectively operable in a cooling mode where said refrigerant is condensed by said outside heat exchanger and is evaporated by said first heat exchanger to supply cool air cooled by said first exchanger through said outlet of said air duct, a heating mode where said refrigerant is condensed by said first and second heat exchangers and is evaporated by said outside exchanger to supply hot air heated by said first heat exchanger through said outlet of said air duct, and a dehumidifying mode where said refrigerant is condensed by said second heat exchanger and is evaporated by said first exchanger to supply air cooled by said first heat exchanger and subsequently heated by said second heat exchanger through'said outlet of said air duct;

a temperature sensor for detecting a temperature corresponding to a temperature of said first heat exchanger;

a timer unit for measuring an elapsed time period during which said temperature of said first heat exchanger detected by said temperature sensor is less than or equal to a predetermined lower limit value; and temperature control means for increasing said temperature of said first heat exchanger when said elapsed time period is greater than or equal to an operation permitting time.

8. An air conditioning apparatus according to claim 7, further comprising an outside air temperature sensor for detecting a temperature corresponding to a temperature of an outside air, wherein said temperature control means shortens said operation permitting time responsive to an increase in said outside air temperature.

9. An air conditioning apparatus according to claim 8, wherein said temperature control means increases said temperature of said first heat exchanger by decreasing an operational speed of said compressor.

10. An air conditioning apparatus according to claim 7, wherein said temperature control means increases said temperature of said first heat exchanger by decreasing an operational speed of said compressor.

11. An air conditioning apparatus according to claim 7, wherein said temperature control means increases said temperature of said first heat exchanger by causing said air conditioner to operate in said heating mode.

12. An air conditioning apparatus according to claim 7 further comprising valve means for switching a flow of said refrigerant in said refrigeration cycle, wherein, in said cooling mode, said valve means causes said flow of refrigerant to pass through said outside heat exchanger, a first one of said at least one pressure decreasing device, said first heat exchanger, said second heat exchanger and said compressor in that order, wherein, in said heating mode, said valve means causes said flow of refrigerant to pass through said second heat exchanger, said first heat exchanger, said first one of said at least one pressure decreasing device, said outside heat exchanger and said compressor in that order, and wherein, in said dehumidifying mode, said valve means causes said flow of refrigerant to pass through said second heat exchanger, a second one of said at least one pressure decreasing device, said first heat exchanger and said compressor in that order.

13. An air conditioning apparatus according to claim 12, wherein said at least one pressure decreasing device includes two capillary tubes disposed between said first heat exchanger and said second heat exchanger and between said first heat exchanger and said outside heat exchanger, respectively.

14. An air conditioning apparatus according to claim 13, wherein said valve means includes:

a four-way valve switching between a cooling position, where said second heat exchanger is connected to an inlet of said compressor and said outside heat exchanger is connected to an outlet of said compressor, and a heating and dehumidifying position, where said outside heat exchanger is connected to said inlet of said compressor and said second heat exchanger is connected to said outlet of said compressor;

a first bypass valve for establishing a path in said refrigeration cycle bypassing said first capillary tube; and a second bypass valve for establishing a path in said refrigeration cycle bypassing said second capillary tube and said outside heat exchanger.

15. An air conditioning apparatus for a vehicle having a passenger compartment, said apparatus comprising:

an air duct having an inlet for receiving air to be conditioned and an outlet for supplying conditioned air to said passenger compartment;

an air conditioner for cooling and heating air received through said inlet of said air duct to supply conditioned air through said air outlet by using a refrigeration cycle circulating refrigerant therein, said refrigeration cycle including a first heat exchanger disposed in said air duct, a second heat exchanger disposed in said air duct at a downstream side of said first heat exchanger, an outside heat exchanger disposed outside of said air duct, a compressor for compressing said refrigerant, and first and second capillary tubes disposed between said first heat exchanger and said second heat exchanger and between said first heat exchanger and said outside heat exchanger, respectively, for decreasing pressure in said refrigeration cycle, said air conditioner being selectively operable in a cooling mode, a heating mode and a dehumidifying mode;

valve means for switching a flow of said refrigerant in said refrigeration cycle, said valve means causing, in said cooling mode, said flow of refrigerant to pass through said outside heat exchanger, said first capillary tube, said first heat exchanger, said second heat exchanger and said compressor in that order, said valve means causing, in said heating mode, said flow of refrigerant to pass through said second heat exchanger, said first heat exchanger, said first capillary tube, said outside heat exchanger and said compressor in that order, and said valve means causing, in said dehumidifying mode said flow of refrigerant to pass through said second heat exchanger, said second capillary tube, said first heat exchanger and said compressor in that order, said valve means including:

a four-way valve switching between a cooling position, where said second heat exchanger is connected to an inlet of said compressor and said outside heat exchanger is connected to an outlet of said compressor, and a heating and dehumidifying position, where said outside heat exchanger is connected to said inlet of said compressor and said second heat exchanger is connected to said outlet of said compressor, a first bypass valve for establishing a path in said refrigeration cycle bypassing said first capillary tube, and a second bypass valve for establishing a path in said refrigeration cycle bypassing said second capillary tube and said outside heat exchanger, an exchanger temperature sensor for detecting a temperature corresponding to a temperature of said first heat exchanger;

a timer unit for measuring an elapsed time period during which said temperature of said first heat exchanger detected by said exchanger temperature sensor is less than or equal to a predetermined lower limit value;

temperature control means for increasing said temperature of said first heat exchanger by decreasing an operational speed of said compressor when said elapsed time period measured by said timer unit is greater than or equal to an operation permitting time; and an outside air temperature sensor for detecting a temperature corresponding to a temperature of outside air, wherein said temperature control means shortens said operation permitting time responsive to an increase in said outside air temperature.

* * * * *